United States Patent [19]
Demesa, III et al.

[11] Patent Number: 5,684,935
[45] Date of Patent: Nov. 4, 1997

[54] RENDERING AND WARPING IMAGE GENERATION SYSTEM AND METHOD

[75] Inventors: Nicanor P. Demesa, III, Irvine; Kenneth S. Herberger, Mission Viejo; Kevin R. Martin, Los Angeles; John R. Wright, Long Beach, all of Calif.

[73] Assignee: Hughes Electronics, Los Angeles, Calif.

[21] Appl. No.: 563,226

[22] Filed: Nov. 27, 1995

Related U.S. Application Data

[63] Continuation of Ser. No. 23,245, Feb. 25, 1993, abandoned.

[51] Int. Cl.$^6$ ................................................ G06T 15/00
[52] U.S. Cl. ................................................ 395/119
[58] Field of Search ........................ 395/119, 124, 395/956; 434/36–38; 273/351

[56] References Cited

U.S. PATENT DOCUMENTS

| | | | |
|---|---|---|---|
| 4,645,459 | 2/1987 | Graf et al. | 434/43 |
| 4,805,121 | 2/1989 | Scott et al. | 395/121 |
| 4,835,532 | 5/1989 | Fant | 345/136 |
| 4,855,822 | 8/1989 | Narendra et al. | 348/114 |
| 4,897,806 | 1/1990 | Cook et al. | 395/126 |
| 4,952,922 | 8/1990 | Griffin et al. | 395/121 |
| 5,091,960 | 2/1992 | Butler | 382/1 |
| 5,175,808 | 12/1992 | Sayre | 395/133 |
| 5,315,692 | 5/1994 | Hansen et al. | 395/119 |
| 5,317,689 | 5/1994 | Nack et al. | 395/163 |

FOREIGN PATENT DOCUMENTS 0168981  1/1986  European Pat. Off. .

OTHER PUBLICATIONS

Fairchild, Kim M.; Marvel, Orin, "Stimulation Gets a New Look", *Defense Electronics*, v16, p. 76(9), Aug., 1984.
Butler, Timothy; Three Approaches to Terrain Rendering; 1991; pp. 926–932.
True et al.; Volume Warping; 1992; pp. 308–315.
Low Altitude High Speed Flight Simulation Using Video Disc Technology Dr. V. Devarajan and J. T. Hooks, Jr., Jul. 25, 1985.

*Primary Examiner*—Heather R. Herndon
*Assistant Examiner*—Rudolph Buchel
*Attorney, Agent, or Firm*—Michael W. Sales; Wanda K. Denson-Low

[57] ABSTRACT

A method and system (10) for generating a plurality of images of a three-dimensional scene from a database and a specified eye point and field of view. The method includes rendering an image frame, and warping the image frame by changing the eye point and field of view. The warping process is continued on the same image frame in accordance with a predetermined criteria, such as an evaluation of the distortion between the initial image displayed and the last image displayed for this image frame. The warping process utilizes convolution to change the eye point and field of view. The database includes a traversal vector for enabling the eye point and field of view to be determined, and a plurality of voxel elements of at least two different type.

8 Claims, 8 Drawing Sheets

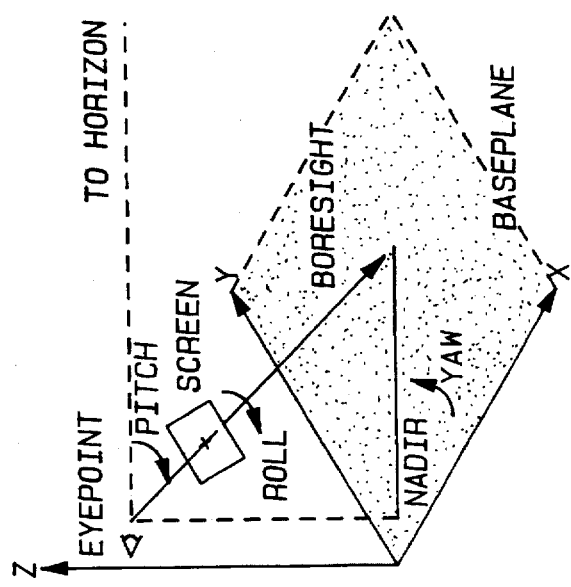
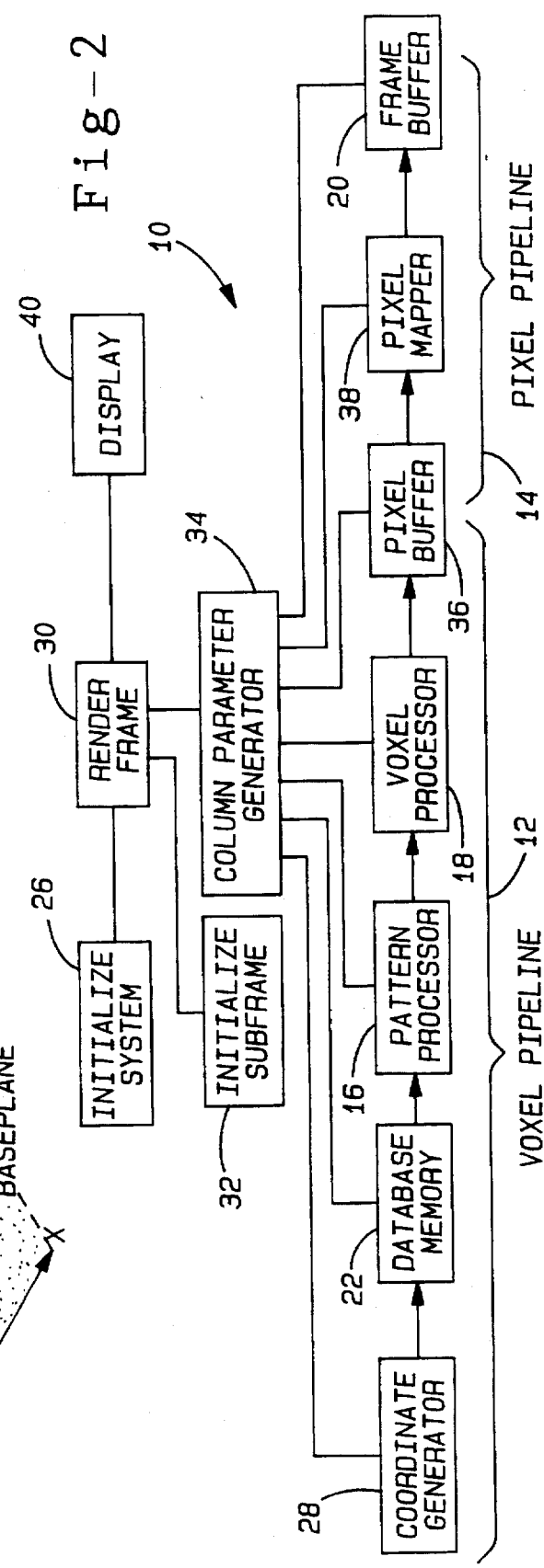

(A) UNSAMPLED OPAQUE VOXELS (B) MODIFIED OPACITIES ALL VOXELS SAMPLED

Fig-7A

```
for (i=1; new_zeye > 0.0; i++)
```

```
for (xpix=0; xpix<w*h; xpix++)
   new_sr[xpix] = max_sr;
   out_image[xpix] = 0;
```

```
sin_new_roll = sin(new_roll);
cos_new_roll = cos(new_roll);
tan_new_roll = tan(new_roll);
sin_new_pitch = sin(new_pitch);
cos_new_pitch = cos(new_pitch);
tan_new_pitch = tan(new_pitch);
sin_new_yaw + sin(new_yaw);
cos_new_yaw + cos(new_yaw);
tan_new_yaw + tan(new_yaw);
```

```
for (xpix = -w/2; xpix < w/2; xpix ++)
```

Fig-7B

```
for (ypix = -h/2; ypix <h/2; ypix ++ )

in_x = (h/2 - ypix - 1)*w + xpix + w/2;
   xp = xpix*cos_old_roll+ypix*sin_old_r...
   yp = ypix*cos_old_roll-xpix*sin_old_r...
   numerator = s*sin_old_pitch - yp*cos_...
   denominator = s*s + xp*xp + yp*yp;
   sin_pitchp = numerator / sqrt(denomin...
   cos_pitchp = sqrt(1.0 - sin_pitchp * ...
   pitchp = copysign (acos(cos_pitchp), n...

gr = sr[in_x] * cos_pitchp;

if (out_x < w*h && out_x >=0)

if (temp_sr <= new_sr[out_x])

new_sr[out_x] = temp_sr;
            out_image[out_x] = in_image[in_x];
#ifdef debug
            printf(" for x=%d y=%d new_x=%f new_y..
#endif
```

```
3out_x++;3
@DDDDBDDDY
    V
if (temp_sr <= new_sr[out_x])
    ZD?DDDDDDDDDDDVDDDDDDDDDD?
    T3                         F3
ZDDDDDDDDDDDDDDDDDDVDDDDDDDDDD?
3new_sr[out_x] = temp_sr;
3out_image[out_x] = in_image[in_x];3
@DDDDDDDDDDDDDDDDDDBDDDDDDDDDDY
            @>0<DDDDDDDDDDDDDDDDDDDY
            3
    ZDDDDDVDDDDD?
    3out_x += w;3
    @DDDDDBDDDDY
         V
if (temp_sr <= new_sr[out_x])
    ZD?DDDDDDDDDDDVDDDDDDDDDD?
    T3                         F3
ZDDDDDDDDDDDDDDDDDDVDDDDDDDDDD?
3new_sr[out_x] = temp_sr
3out_image[out_x] = in_image[in_x];3
@DDDDDDDDDDDDDDDDDDBDDDDDDDDDDY
            @>0<DDDDDDDDDDDDDDDDDDDY
            3--
    ZDDDDDVDDD?
    3out_x  :3
    @DDDDBDDDY
         V
if (temp_sr <= new_sr[out_x]
    ZD?DDDDDDDDDDDVDDDDDDDDDD?
    T3                         F3
ZDDDDDDDDDDDDDDDDDDVDDDDDDDDDD?
3new_sr[out_x] = temp_sr;
3out_image[out_x] = in_image[in_x];3
```

Fig-7E

```
sprintf(out_file_name, "%s%d", "test_", "w");
out_file = fopen(out_file_name, "w");
fwrite(out_image, w, h, out_file);

printf(" Enter new x,y,z,r,p,y of eye....");
scanf("%f %f %f %f %f %f", &new_xeye,....);
new_yaw = new_yaw * d2r;
new_roll = -new_roll * d2r;
new_pitch = new_pitch * d2r;

/*
..
*/ exit(0);
```

RENDERING AND WARPING IMAGE GENERATION SYSTEM AND METHOD

This is a continuation application Ser. No. 08/023,245, filed Feb. 25, 1993, now abandoned.

BACKGROUND OF THE INVENTION

1. Field of the Invention

The present invention relates generally to image generation systems, and particularly to a method and system which substantially reduces the computer power required to generate real-time and near real-time photorealistic and voxel-based images.

2. Description of Related Art

Previous attempts to create three-dimensional real-time images have generally required the use of very expensive and/or custom computer systems in order to provide acceptable images. While the image quality of polygon-based image generation systems is improving, the images often still resemble scenes of cartoon animation. Accordingly, significant efforts have been made in recent years to create imaging methods which reduce the computational requirements needed to generate an image frame, while making the final scene more realistic. However, problems like temporal and spatial aliasing associated with the discrete digital nature of computer generated scenes, realistic terrain generation, and the need to reduce the disk storage spaced required, have only added to the computational requirements.

Thus, the need exists for a relatively low cost solution which will enable photorealistic animated sequences to be generated at real-time frame rates. Such a low cost solution could find application in fields as diverse as movie creation, flight simulation, medical imagery and military simulations. One of the benefits of such a solution would be to enable multimedia real-time animation to be used to substantially advance existing training systems.

Accordingly, it is a principal objective of the present invention to provide a system and method for generating images of photorealistic quality from a database using one or more general purpose computers at real-time rates of 1 Hz–600 Hz.

It is a more specific objective of the present invention to provide an image generation system and method which is capable of employing photorealistic and voxel databases to create real-time image sequences using off the shelf computer technology.

It is another objective of the present invention to provide an image generation system and method which is capable of rapidly creating a sequence of three-dimensional images from a single image frame.

It is a further objective of the present invention to provide a voxel-based image generation system and method in which the sequence of images generated may be displayed, stored on either digital or analog media, or transmitted to other computer systems.

SUMMARY OF THE INVENTION

The present invention provides a method and system for generating a plurality of images of a three-dimensional scene from a database and a specified eye point and field of view. The method includes the steps of rendering an image frame, and warping the image frame by changing the eye point and field of view. The warping process is continued on the same image frame in accordance with a predetermined criteria, such as an evaluation of the distortion between the initial image displayed and the last image displayed for this image frame. The warping step utilizes convolution to change the eye point and field of view. The database includes a traversal vector for enabling the eye point and field of view to be determined, and a plurality of voxel elements of at least two different type.

One of the advantages of the invention is the ability to rapidly produce a sequence of computer generated images by avoiding the need to render an image frame for each image change sought to be achieved. In one embodiment according to the present invention, the database includes a plurality of sub-frames for defining a three-dimensional scene, and the rendering step separately creates a sub-frame image from each database sub-frame. Thus, a plurality of computer processors may be employed to render each of the sub-frames in a parallel operation.

BRIEF DESCRIPTION OF THE DRAWINGS

FIG. 1 provides a diagramatic view which illustrates the six degrees of freedom employed to specify the eye point and the positions of moving objects.

FIG. 2 provides a block diagram of the system employed to render an image frame.

Figure 7A:
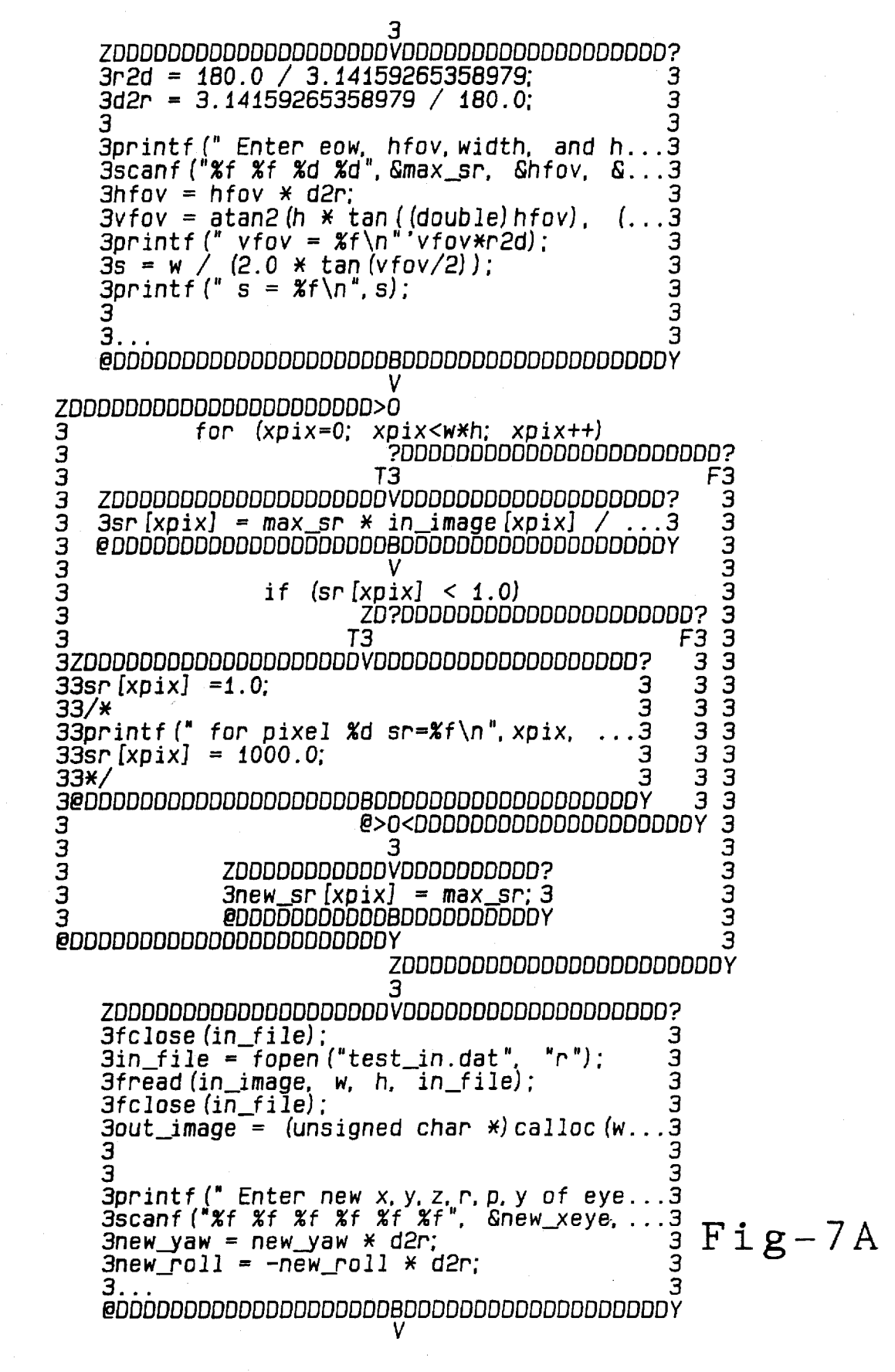

FIGS. 7A–7E provide a flow chart of the warping process shown in FIG. 6.

DESCRIPTION OF THE PREFERRED EMBODIMENTS

Figure 3:
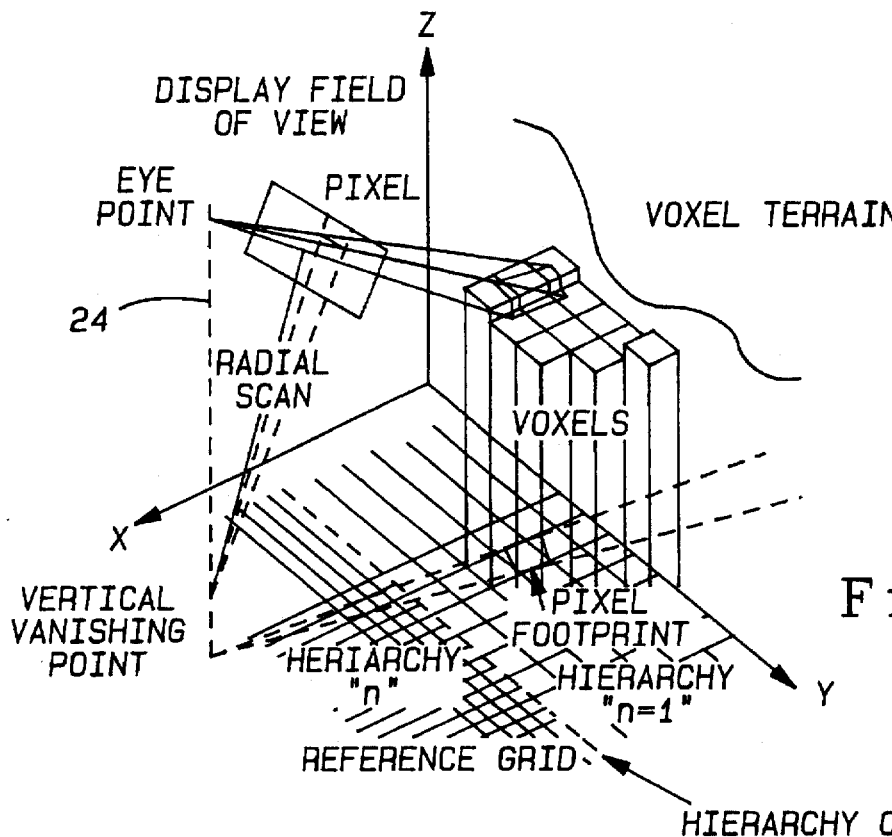
FIG. 3 illustrates the perspective projection of voxel elements to a display screen.

A voxel-based, forward projection algorithm with a pipeline architecture for real-time applications is described herein, which offers a true perspective from any viewing angle. The rendering algorithm provides several features applicable to flight simulators, such as haze, repositionable target models, smooth shading, and specular reflections, and is designed for implementation on a pipelined processor for real-time applications. In addition, the terrain and object databases are implemented using voxels, or volume elements, to provide greater resolution and scene content than is normally available in polygon-based systems. The eyepoint is specifiable with six degrees of freedom as are the positions of the objects. The rendered image is a perspective projection of the voxels to the screen along rays from the database to the eyepoint. This puts it in the class of forward projection algorithms with similarities to the cell by cell processing discussed in an article entitled "V_BUFFER: Visible Volume Rendering", by Upson and Keeler, Proceedings of SIGGRAPH, August, 1988, pp. 59–64. This article is hereby incorporated by reference. Multiple objects are processed from back to front and range resolved with a modified Z-buffer.

The rendering algorithm described herein uses two types of voxels, called case II and case III. A case II voxel is used to represent terrain and surface data and is a rectangular solid represented by four corner posts with a surface stretched between them. Each corner has an accompanying height and color which are bilinearly interpolated across the surface. The corner posts are shared between the four neighboring voxels so the surface is contiguous. Normally, only the top of a case II voxel is visible. If the side is visible, it will be a constant color.

For vertical surfaces with some variety, case III voxels are used. A case III voxel contains a height and a color, which represents a base, and a pointer to a vertical stack of segments, called a pattern, which make up the vertical information resting on top of the base. Each segment in the stack contains a height, or length, and a left and right color. The left and right colors provide for interpolation in situations where color varies across the volume of the voxel. It also contains surface normal information, for shading and specularity, and some flags. The segments may be opaque, transparent, or translucent. In fact, all voxels can have an opacity anywhere between transparent and opaque. All references to color later in this paper include an accompanying opacity and specularity. Repositionable objects, such as tanks, trucks, ships, aircraft, explosions, etc., are composed of case III voxels. A terrain database may contain embedded case III objects, such as buildings and trees, surrounded by case II voxels.

Most of the case III objects may be voxellized (scan-converted to voxels) from polygon models using techniques discussed in the following articles: "3D Scan-Conversion Algorithms for Voxel-Based Graphics", by Kaufman and Shimony, Proceedings of 1986 ACM Workshop on Interactive 3D Graphics, October, 1986, pp. 45–76; "Efficient Algorithms for 3D Scan-Conversion of Parametric Curves, Surfaces, and Volumes", by Kaufman, Proceedings of SIGGRAPH, vol. 21, no. 4, July, 1987, pp. 171–179; "An Algorithm of 3D Scan-Conversion of Polygons", by Kaufman, Proceedings EUROGRAPHICS, August, 1987, pp. 197–208; and "3D Scan-Conversion Algorithms for Linear and Quadratic Objects", by Cohen and Kaufman, Volume Visualization, IEEE Computer Society Press, 1990, pp. 280–301. These articles are hereby incorporated by reference.

A database is composed of several layers, each containing a particular type of information such as elevation, color, flags, pattern numbers, etc. The layers are broken up into rectangular regions which represent an area of the database at a given resolution. All the layers within a region are correlated with each other through various orthorectification and image mosaicking steps during database creation. Many of the steps involved are discussed in "Preparing Data Bases For Perspective Scene Generation", by Whiteside, Proceedings of SPIE, vol. 1075 Digital Image Processing Applications (1989), pp. 230–237. This article is also hereby incorporated by reference.

Multiple resolution levels are generally available for each region providing for lower resolution data over a wide area with high resolution inserts for approaches and other low altitude operations. Each database also has a corresponding pattern segment table containing the patterns for all case III voxels in all regions in the database. Each database rests on a baseplane which is the (x,y) plane at an elevation (z) value of zero.

A database can be visual, with an RGB layer, or infrared (IR) with an intensity layer. During the creation process, an IR database begins as multi-spectral images. These multi-spectral images are segmented into areas of similar characteristics and the material types of the areas are determined. The thermal parameters, such as albedo, emissivity, and conductivity, are then used, along with the sun position and surface normal, to determine the thermal radiance for each voxel in the database. The radiance layer is then rendered the same as an RGB database. The process for generating these IR databases is discussed in "Voxel Terrain Material Database and Synthetic IR Scene Generation", by Quarato et. al., Proceedings of Ground Target Modeling and Validation Conference, April, 1991. This article is hereby incorporated by reference. This method provides for correlated sensor databases. Similar databases can be used for synthetic aperture, real beam, or millimeter wave RADAR or LASER RADAR (LADAR) imaging. The algorithms for rendering would be somewhat different, however. The use of IR simulation algorithms for voxel target models is discussed in "Real Scan Evolution", by Patz et. al., a public report prepared for the Naval Training Equipment Center, 80-D-0014-2, February, 1982. This report is also hereby incorporated by reference.

As shown in FIG. 1, the eyepoint, as well as the positions of moving objects, are specified with six degrees of freedom: x, y, z, roll, pitch, and yaw. The x, y, and z values are specified relative to the origin of the database (e.g. the southwest corner). Yaw is rotation about the z (vertical) axis measured relative to the x axis of the database. Pitch is rotation about the y axis above or below the horizon. Roll is rotation about the x axis which is the boresight. The boresight is defined as a line passing through the eyepoint and the center of the screen.

Referring to FIG. 2, a system 10 for implementing the rendering algorithm is shown. The rendering algorithm is divided into two separate pipelineable sections, namely a voxel pipe 12 and a pixel pipe 14. Each pipe is comprised of several modules which perform the appropriate calculations. Several of these modules may be implemented in separate computer processor, such as the pattern processor 16 and the voxel processor 18. Additionally, each of the sub-frames may be rendered through different groups of distributed processors which may be sharing memory. However, it should be noted that one or more general purpose digital computers may be used to perform the methods according to the present invention. In one form of the present invention, it is preferred that computers capable of running under the UNIX operating system and X Windows environment be employed, such as a Sun SPARCstation2.

The voxel pipe 12 accesses the database voxels along a straight line which is the current column of pixels projected onto the baseplane of the database. This column of voxels is mapped onto the pixel column which is then processed by the pixel pipe 14 into a column of pixels across the frame buffer 20. The projection of voxels to the screen, rather than the projection of pixels to the database, is the hallmark of a forward projection algorithm.

FIG. 3 illustrates the perspective projection of voxels to the screen. In this regard, it should be noted that the reference grid at the bottom of FIG. 3 shows how the database (e.g., database memory 22) may be constructed in a hierarchy of different resolutions. FIG. 3 also shows a traversal vector 24 which extends from the eyepoint down to the reference grid. The traversal vector 24 may be used in the warping process, described below, to compute a new eyepoint, as well the information concerning the field of view and the size in pixels of the 2D image frame.

A column of voxels is generated by starting at the nadir, which is the point of the database immediately below the eye, and stepping out along a straightline. The steps are determined by projecting a pixel column to the baseplane and computing the angle between the line thus generated and the axes of the database. The delta x and delta y are found using the sine and cosine of the computed angle. This fixed pattern of accessing the database means that the rendering time is relatively independent of scene complexity. Each step lands on a voxel which may be either of the two types listed above. If the voxel is case II, the height and color are bilinearly interpolated from the four corners to the step point within the voxel. If the voxel is a case III voxel, the corresponding pattern is located and each segment in the pattern becomes another voxel in the column. At this point, each voxel is comprised of a height, color, and ground range from the eye. From the height of the voxel, the height of the eye, and the ground range to the step point, the depression angle to the top of the voxel is calculated. This is the angle above or below the horizon with the nadir being 90 degrees, the zenith being −90 degrees, and the horizon being zero.

Knowing the depression angle to the voxel, as well as the depression angle to the top and bottom of the screen for the current column, it is possible to calculate the fraction of the column being covered by the voxel. If a case III voxel is being processed, the depression angle of both the top and bottom of each pattern segment are used to calculate the coverage. The column is divided into pixels with each pixel occupying a fixed angular portion of the column. Therefore, a voxel is converted to pixels by computing which pixels, or portions of pixels, are covered by the voxel through simple angular comparisons. The voxels are accumulated into pixels in a front to back order.

Once the entire column of pixels has been generated it goes into the pixel pipe 14. The pixel pipe 14 takes each angular pixel and calculates a screen, or frame buffer, location for it. This is done by using the depression angle of the pixel and the angle between the current column and the column at the center of the screen and doing a polar to flat screen coordinate transformation. At the same time, it performs the roll calculation, rotating the pixels to their final (x,y) position. The pixel pipe 14 then performs a Z-buffer range resolution function by discarding pixels behind those already on the screen and then integrates the visible pixels into neighboring positions in the frame buffer 20.

Figure 4:
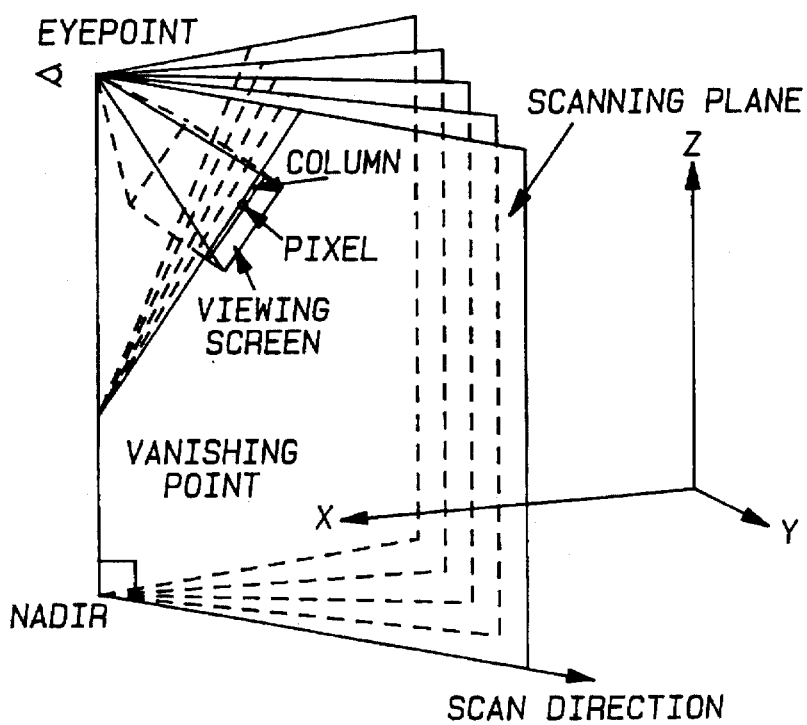
FIG. 4 illustrates a radial scan technique for displaying voxel columns.

It is important to note that the voxel columns are projected as planes passing through the eyepoint and the nadir such that they are always perpendicular to the baseplane of the database being rendered. This means that all segments of a vertical pattern will be projected into the same column. However, a column of pixels will not necessarily be parallel to any edge of the screen or even to any other column. In fact, the columns form a radial spoke pattern with the nadir or zenith at the center, as shown in FIG. 4. As mentioned above, FIG. 2 provides a block diagram of the modular structure of the rendering algorithm implementation. The modules included in the diagram will be discussed in more detail individually.

The Initialize System module 26 initializes the system 10, loads the database, and initiates the frame rendering. The basic function of the database load function is to load a database region and to update the valid region tables for the Coordinate Generator module 28. The valid region tables contain the information about what regions, at what resolution levels, are valid for which areas of the database. Multiple regions, which may partially or fully overlap, may be loaded for a given resolution level.

The Render Frame module 30 performs some frame initialization calculations, reads in the eye and object positions for the frame, and then renders the subframes by initiating the appropriate modules. In particular, the frame initialization includes sorting the moving objects based on range. The subframes are rendered terrain first (if any), and then any moving objects from far to near. This ordering is important because the pixels must enter the frame buffer in a far to near order for proper accumulation and attenuation if translucencies are involved. The Initialize Subframe module 32 then performs the subframe initialization tasks such as determining object visibility, scan limits, trim angles, and pixel subtend angle, and transforming the eye position in world coordinates to the eye position in subframe coordinates. The scan limits calculation insures that all pixels on the screen are generated, yet minimize the number of columns and pixels per column, it is desirable to trim the columns at the edges of the screen, or at the limits of the objects prior to generating the pixels. To do this, it is necessary to use the screen parameters (width, height, field of view, pitch, roll, etc.) to generate the appropriate column parameters.

The rendering of a single frame is broken down into the rendering of multiple subframes. Each subframe is comprised of rendering a single database, meaning the terrain, or a single object. The rendering of a subframe is done under the control of the Column Parameter Generator (CPG) module 34. The CPG module 34 generates various parameters for the processing of each of the columns needed to complete a subframe within the scan limits previously determined. These are the sine and cosine of the ground column angle (the angle between the projection of the column to the baseplane and the projection of the boresight column), the angle to the bottom and top of the screen (or trim angle) for that column, the delta x and delta y and the diagonal step size. Given the ground column angle, the CPG module 34 computes the pitch angle to the top and bottom of the screen for the particular column. Because of the radial scan and roll, the column may actually intersect the sides of the screen instead of top and bottom. The CPG module 34 determines which sides of the screen the column intersects. Using the aspect ratio of the screen, the CPG module 34 computes the pitch of the intersection of the column and the edges of the screen. If the nadir is on the screen, then the bottom angle is set to +90 degrees. Similarly, if the upper nadir, or zenith, is on the screen, then the top angle is set to −90 degrees.

The Coordinate Generator module 28 uses an initial x and y starting position and a delta x and y to generate a series of voxel addresses which step across the database. For each x and y step, the Coordinate Generator 28 checks a valid region table to find the best resolution data available at that (x,y) position. The best resolution is the finest resolution data available which is at least as coarse as the desired resolution level, determined by slant range. Once it has determined the resolution level of the best data available, it locates the address of that data within the database memory.

The Database Memory module 22 accepts a column of voxel addresses and accesses its memory to retrieve the color and elevation information for the four neighbor corners. If the voxel is of case II, the four corners are then bilinearly interpolated in color and elevation and a final voxel is produced. If the voxel is III, the appropriate data is retrieved.

The Pattern Processor module 16 handles the voxels which are case III. The case III voxels cause the Pattern Processor module 16 to access the pattern memory to retrieve the vertical color and elevation information above the base voxel. Each piece of vertical information, called a segment, becomes a separate voxel within the voxel arrays. To ensure the proper accumulation of voxels into pixels, the Pattern Processor module 16 will output the stack of segments from the eye elevation up and then down. This ensures that all voxels will contribute to pixels from the nearest to the farthest. Within the voxel/pixel column, the voxels are processed from front to back. Certain flags must be set to ensure that the voxels going up and those going down are processed appropriately. In addition, the Pattern Processor 16 performs smooth shading calculations for the case III voxels. Each case III pattern segment has a horizontal and a vertical orientation, value. Using the sun position, the Pattern Processor 16 computes the incident sun angle for each segment and combines the sunlight color, the ambient light color, and the voxel color using the following standard formula:

$$I_{final} = I_{vox} * (I_{amb} + I_{sun} * \cos(\text{incident angle}))$$

The formula is computed for each channel, once for IR or three times for RGB.

The Voxel Processor 18 accepts a stream of voxels which have been prepared by the Pattern Processor 16 and calculates the depression angle and slant range to each. The slant range and depression angle are calculated from the ground range from the eye to the voxel (as determined by the number of steps taken to get there), the height of the voxel above the baseplane, and the height of the eye above the base plane. Voxels are processed as rectangular solids so they have the appropriate cross-section at any viewing angle.

The other major function of the Voxel Processor 18 is the planning scan. When the pipeline processor begins to process a column, it begins by doing a planning scan at a coarse resolution to determine the correct hierarchies to access for each region. The Voxel Processor 18 computes the desired hierarchies during the planning scan. The correct hierarchy is determined by requiring the system to choose voxels which are wider than the distance between neighboring columns at that slant range. This causes the algorithm to select coarser and coarser resolution data as it renders data further from the eyepoint. To find this distance the following formula is used:

$$\text{distance} = \sin(\text{column angle}) \times \text{slant range}$$

Once this distance is known the appropriate size voxels can be selected. FIG. 3 illustrates the selection of appropriate sized voxels based on slant range. To avoid a large processing overhead for the planning scan, the voxel data utilizes several levels of resolution coarser than expected, if available. This method allows us to determine the desired hierarchy for the voxels but does not allow locating hidden regions or determining the number of steps to the first voxel visible on the screen.

The Pixel Buffer 36 is one of the most sophisticated functions in the renderer. It accepts voxels from the Voxel Processor module 18 and produces pixels which are stored in the column buffer. The column buffer is included within the Pixel Buffer module 36. The incoming voxels have a slant range and depression angle which the Voxel Processor 18 calculated. The depression angle and the voxel's color and opacity are the primary values used when generating pixels.

Voxels entering the Pixel Buffer 36 are accompanied by a color, an opacity, a slant range, a depression angle, and some flags. The Pixel Buffer 36 compares the current depression angle and the previous depression angle to the angular positions of the pixels to determine which whole and partial pixels are covered by this voxel. The whole and partial pixels may be handled two different ways. A bit map may be used to determine the portion of the pixel which has been filled in. This conserves column buffer memory but does not handle translucent pixels well. If a larger column buffer is not a problem, all pixels may be subdivided into subpixels, each of which acts as a single, whole pixel in the column buffer. Within each subpixel, the opaque and translucent sections are accumulated independently with each portion coming in being attenuated by the already accumulated translucent portion. The voxels are accumulated into the pixels in a front to back order. Once an opaque voxel fills in a pixel, the pixel is marked as filled and no further contributions are made to it. As pixels are filled in, the Pixel Buffer 36 maintains the depression angle to the top of the filled-in portion of the column. When that angle reaches the top of the screen the column is finished. Then the pixel column is output to the pixel pipe, with each group of n subpixels being accumulated (averaged) into a single output pixel.

In addition, The Pixel Buffer module 36 performs specularity calculations for the pixels. Since a given voxel, with a specific surface normal, may cover several pixels, the specularity must be computed for each pixel individually. To perform the specularity calculation, the Pixel Buffer 36 uses the depression angle of the pixel and the column angle to compute the vector from the voxel to the eyepoint. Then it uses that vector, along with the vector to the sun, to compute the bisecting vector. Then the cosine of the angle between the bisecting vector and the surface normal is used, along with the specularity, or shininess, of the voxel, to compute the amount of sunlight being reflected toward the eye. The sunlight is then combined with the smooth shaded intensity computed by the pattern processor to give the final color which this voxel imparts to this particular pixel. Note that the opacity of the specular reflection is dependent on the intensity of the specular highlight, not the opacity of the voxel. Thus, transparent glass can have a bright reflective spot which masks anything behind it.

Once the entire column of pixels is complete, it must pass down the pixel pipe 14. The first module is the Pixel Mapper 38 which maps each pixel from polar coordinates to flat screen coordinates. The polar coordinates are represented by the ground column angle and the pixel's depression angle. Using the pitch, roll, screen size, and field of view, the pixel is mapped to an (x,y) position on the screen. Then, the roll angle as applied about the center of rotation.

For improved performance, the calculations are performed with a folded algorithm, as follows:

$$x = \frac{k1 - k2 \tan \theta}{k3 + k4 \tan \theta} + x\_center$$

$$y = \frac{k6 - k7 \tan \theta}{k3 + k4 \tan \theta} + y\_center$$

The kn values are subframe and column constants which are computed by the CPG module 34 for each column and θ is the pixel pitch.

The other function of the Pixel Mapper 38 is to implement a haze algorithm. The haze appears as a replacement of some of the pixel's intensity, in IR or RGB, with some haze intensity. The amount of the pixel's intensity remaining is a function of slant range, pitch, and haze density as follows when pitch ≠0:

$$W_o = e^{Ae^{BZ_{eye}}(1-e^{B\sin(pitch)})/B\sin(pitch)}$$

and when pitch=0:

$$W_o = e^{R_s A e^{BZ_{eye}}}$$

where Rs is slant range from the eye to the pixel, Zeye is the elevation of the eyepoint, pitch is the depression angle of the pixel from the horizon, and A and B are the haze density and vertical distribution parameters, respectively. The haze and original pixel are combined as follows:

$$I_{final} = I_{pixel} * W_o + I_{haze} * (1.0 - W_o)$$

Note that for moving objects it is expected that the haze density will either not vary significantly across them (if they are far away they should be small) or not be very dense (if they are close the haze should be thin) so the pitch to the centroid of the object is used instead of the pixel pitch. This is because the pixel pitch of objects is in terms of the subframe coordinate space, not the terrain coordinate space where the haze exists.

The Frame Buffer module 20 accepts a column of pixels and blasts them into the frame buffer by accumulating the pixel into each of the four corner pixels around the incoming pixel's (x,y) position. The Pixel Mapper module 20 performs the mapping function to a higher degree of accuracy than would be required to simply find the appropriate (x,y) position. The extra resolution is used to determine the mapped pixel's position within the destination pixel. The accumulation into the four neighboring corner pixels is weighted by the inverse of the distance of the mapped pixel position from each corner. This technique is similar to that known as splatting. Each pixel accumulates the sum of the weights of incoming pixels and the sum of the products of weight and intensity. The weighted pixels are then range resolved in a standard Z-buffer implementation.

The frame buffer is the primary place where translucent pixels are combined, although it is also done in the pixel buffer. The algorithm for attenuating colors visible behind a translucent material can be different for different applications. The transport equation defines how background information is attenuated by non-opaque voxels in front. In the visual band (EO), translucent material is treated as an aerosol. Thus, the more opaque the material, the more of it will be seen and the less of the background. If The material is transparent, it provides no color to the pixel at all. In contrast, in the infrared (IR) band, the transmissivity and the emissivity of a material may be relatively independent. Therefore, a material could be totally transparent, and thus pass through all the background contribution, and still emit in the same waveband, thus contributing additional intensity to the pixel. The actual transpose equations are:

$$I_p = I_{fg} * O_{fg} + I_{bg} * (1.0 - O_{fg}) \text{ for EO}$$

$$I_p = I_{fg} + I_{bg} * (1.0 - O_{fg}) \text{ for IR}$$

where $I_p$ is the final pixel intensity, $I_{fg}$ is the foreground material intensity, $I_{bg}$ is the background material intensity, $O_{fg}$ is the opacity of the foreground material, and $O_{bg}$ is the opacity of the background material. Note that the difference in the equations is that the intensity contribution of each material is a function of its own opacity in the EO equation but not in the IR equation.

The Display module 40 normalizes the accumulated intensities in the frame buffer by dividing by the accumulated weights to generate the final image. If the desired image is to be in the visual band, three channels (red, green, and blue) are processed, while a single channel is processed for infrared.

When rendering moving objects, each object is rendered as an individual subframe and the pixel images are range-resolved and merged within the frame buffer. Each object is represented as an individual database and rendered independently. The initialize subframe module 32 transforms the eyepoint in world coordinates and the object position in world coordinates into an eyepoint in object coordinates, relative to the origin and axes of the object database. Multiple objects may be rendered in each frame, and multiple copies of the same object, in different positions, may also be rendered. The objects are range ordered from far to near for rendering so the frame buffer can properly range resolve the pixels. This is because the frame buffer does not store opacities, only range and color. Therefore, if a pixel already has a contribution, it is assumed to be opaque. To ensure that this condition matches the actual pixel ordering, the terrain is rendered first which fills the screen with opaque pixels. Then each object is rendered and range-resolved with the opaque terrain. The objects may have translucent portions which attenuate the background via the transport equation but the attenuated pixel will still be opaque in the frame buffer. Thus, the objects must be rendered from far to near to ensure the proper accumulation of translucent colors.

Aliasing is a significant problem in real-time rendering applications. Problems which are invisible in a single frame become glaring when a sequence of frames are displayed in real-time. These temporal aliasing problems include flickering, swimming, strobing, and other anomalies. Of course, spatial aliasing problems, such as jaggies, need to be controlled as well. This rendering algorithm employs several techniques for controlling both spatial and temporal aliasing. For example, when generating a column of pixels, the pixels are supersampled in the vertical direction and multiple pixels are combined into a single pixel before passing into the pixel pipe. This causes the horizontal edges of objects to be more accurately sampled to prevent popping from one pixel to the next as well as reducing jaggies along the edge.

Figure 5A:
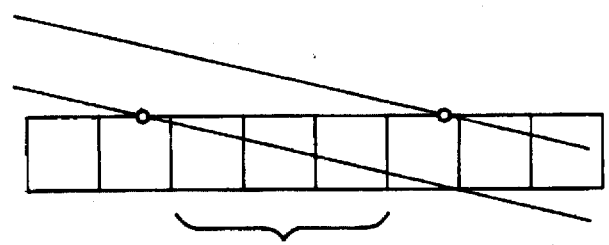
FIGS. 5a and 5b illustrate a technique for anti-aliasing.
Figure 5B:
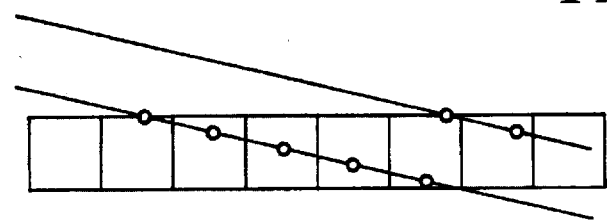

Another anti-aliasing technique used is called vertical feature anti-aliasing. If a column intersects a vertical feature, such as a wall, at a shallow angle, adjacent voxel columns may intersect the wall several voxels away. Then, as the eyepoint moves, the columns move over to intersect voxels they missed before and the wall appears to shimmy and flicker. This problem is reduced by combining the contributions of all voxels along the wall which the column passes through. The algorithm uses the angle between the column and the surface normal of the wall to determine how many steps it will take for the column to pass from the front of the wall to the back. Then the opacity of the voxel is modified (reduced) proportionately to how many steps remain. The last voxel remains opaque to make sure the wall doesn't appear translucent. This technique is equivalent to super-sampling the wall voxels without the cost of extra pixels or columns. FIGS. 5a and 5b illustrate this technique.

Of course, this technique assumes that the horizontal distance between two columns is less than the width of a voxel. This is handled by the Coordinate Generator 28 by selecting the appropriate resolution voxels based on the slant range from the eye to the voxel. This process also performs an additional anti-aliasing function in that no voxels can be missed by adjacent columns. If voxels could be missed, flickering would occur as voxels were hit and then missed as the eyepoint moved.

Another technique, discussed previously, is blasting, or splatting, in the frame buffer. As a pixel enters the frame buffer, it contributes to four adjacent pixels proportionately to the inverse of its distance from the corners. This prevents edges from popping from one pixel to the next. In addition to blasting, the edges of moving objects, or subframes, are detected and blended with the background pixels for smoother edges with fewer jaggies and less popping.

Figure 6:
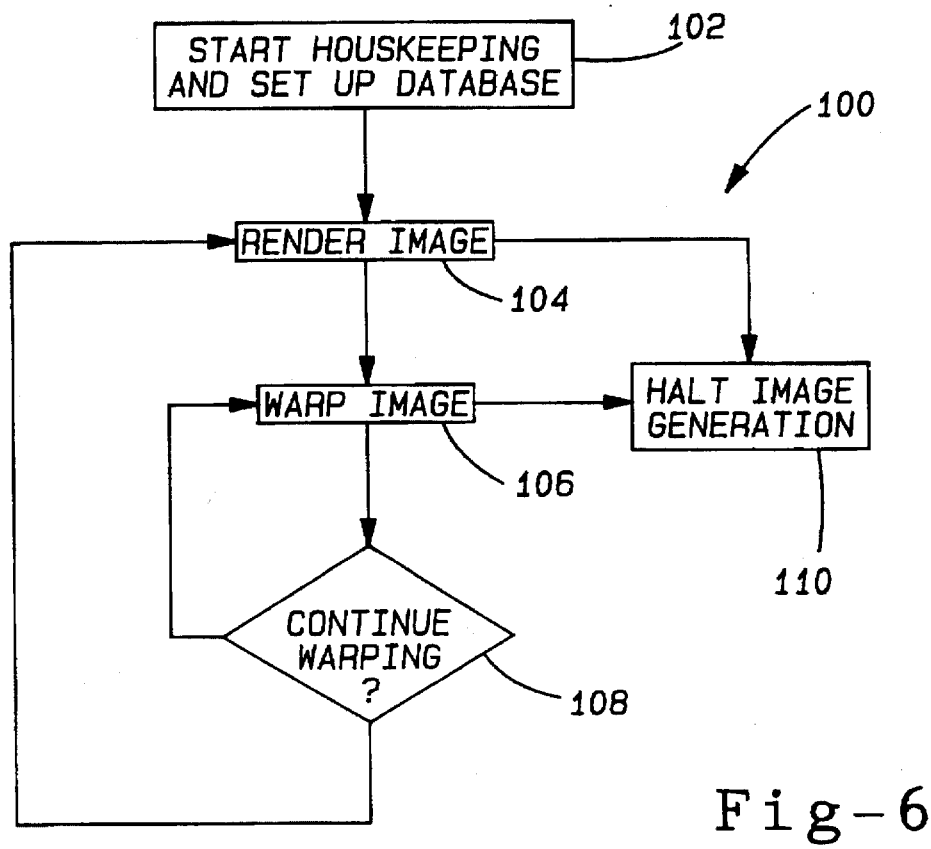
FIG. 6 is an overall flow chart of the image generation method in accordance with the present invention.

Referring to FIG. 6, an overall flow chart of the method 100 according to the present invention is shown. In this regard, the housekeeping and setup block 102 generally corresponds to the initialize system module 26 shown in FIG. 2. Similarly, the render image block 104 generally represents a combination of all of the other modules shown in FIG. 2. Accordingly, it should be appreciated that the housekeeping and setup block 102 provides the initial parameters for the rendering process. Additionally, the render image block 104 is used to extract three-dimensional information from the database and create an image frame. More specifically, an image frame is a two-dimensional picture of a three-dimensional scene at a particular eye point and field of view. Ultimately, an image frame will form part of a set of image frames, which are separated in time, in order to generate a real-time or near real-time moving image sequence. As shown above, the rendering process utilizes a traversal vector through the three-dimensional database in order to compute an eye point and information concerning the field of view and the size, in pixels, of the two-dimensional image frame. The traversal vector, location, eye point, and field of view are provided as initial values, and these values may be superseded by other concurrent processes. It should also be appreciated that a variety of rendering processes may be employed in the appropriate application.

Once an image frame has been rendered, the method proceeds to the warp image block 106. The process of warping an image is generally comprised of creating an image frame from an existing image frame by operations which adjust the eye point and field of view. In other words, the warping process involves a distortion of the eye point (or the eye point and the field of view) to simulate a new image frame without having to go through the rendering process. The result of the warping process is that some of the pixels in the image frame will effectively be stretched, while other of the pixels in the image frame will be compressed. In this context, the stretching of a pixel is achieved by increasing the number of pixels to be displayed which would be the same as the pixel being stretched. Similarly, pixel compression implies the elimination of a number of pixels that would otherwise be displayed.

The warping process may be achieved through the procedure set forth in the flow chart of FIGS. 7A–7D. It should also be pointed out that the visual effect produced by warping is best achieved when the images to be displayed are not rapidly changing. In this regard, it should be understood that it may be desirable to render a small portion or subframe of an image in combination with the warping process. In other words, a small section of an image may undergo a rendering process (e.g., ray tracing), while the remainder of the image frame is warped in order to avoid a blurred image.

In accordance with the present invention, the warping process 106 may be continued a number of times before it is appropriate to render another image frame. In this regard, diamond 108 shows a step which evaluates whether or not the warping process should be continued. The continue warp step 108 may use a simple count and/or perform an evaluation on the basis of the amount of distortion between adjacent image frames. For example, it may be desirable perform the rendering step for every tenth image displayed in a particular image sequence. When it is desired to use the amount of distortion as a criterion, a small portion of an appropriate image frame could be rendered to determine how far apart a particular portion of the image has been displayed as a result of the warping process with a corresponding portion of a rendered image. For example, a particular high point on a terrain could be used to evaluate whether or not the warping process should be continued.

It should also be noted that the flow chart of FIG. 6 also includes a block 110 for halting the image generation process. The halt image generation block 110 is responsive to either the render image block 104 or the warp image block 106. Thus, it should be appreciated that the image generation process may terminate from either the last image that has been rendered or the last image that has been warped. As mentioned above, FIGS. 7A–7E provide a flow chart of the warping process 106 shown in FIG. 6. In this regard, it should be noted that that particular flow chart was generated automatically from the warping process code, which was created in the "C" language. It should further be noted that this warping process code represents a version of the warping process which facilitates the testing of the program. For example, the block 112 includes a statement which requests that the user enter a new horizontal field of view ("hfov") and so forth. In a final version of the program, the appropriate file would be opened to extract this information. As shown in this code-based flow chart, the warping process program includes two major loops, namely a loop which is responsive to a new eye point, and a loop which stretches/compresses the pixels. However, as noted above, other suitable warping programs may be employed in the appropriate application, such as a warping program which is based on convolution.

While the above detailed description sets forth the preferred embodiments of the present invention, it will be understood that the present invention is susceptible to modification, variation and change without departing from the scope and fair meaning of the subjoined claims.

What is claimed is:

1. A method of generating a plurality of images of a three-dimensional scene for a simulator, comprising the steps of:
   (a) providing a database for permanently storing voxel based data which defines said three-dimensional scene from an initial eye point and field of view;
   (b) rendering a first image frame from said permanently stored voxel based data in said database;
   (c) generating a first warped image frame by warping said first rendered image frame by changing said initial eye point and field of view;
   (d) generating successively warped images frames by warping a previously warped image frame with a different eye point and field of view until a predetermined distortion is reached between a most recently warped image frame and a second most recently warped image frame; and
   (e) rendering a second image frame once the predetermined distortion has been reached.

2. The method according to claim 1, wherein said database includes the initial specification of a traversal vector for enabling said eye point and field of view to be determined in said warping step, said traversal vector defining an area of said database to be warped which is larger than said field of view.

3. The method according to claim 2, wherein said rendering step includes the extraction of three-dimensional information from said database and determination of said initial eye point and field of view.

4. The method according to claim 1, wherein said warping step is employed in combination with rendering a subframe, said subframe having a distortion level substantially the same as said predetermined distortion.

5. The method according to claim 1, wherein said database includes a plurality of sub-frames for defining said three-dimensional scene, and said rendering step utilizes one or a plurality of the subframe images from said database to generate a new subframe image.

6. The method according to claim 1, including the step of controlling both spatial and temporal aliasing for said rendered image and for said warped image.

7. The method according to claim 1, including the step of repeating steps (d) and (e) at least once.

8. A system for generating a plurality of images of a three-dimensional scene for a simulator, comprising:

database means for permanently storing voxel based data for defining said three-dimensional scene from an initial eye point and field of view;

means for rendering a first image frame from said permanently stored voxel based data in said database;

means for generating a first warped image frame by warping said first rendered image frame by changing said initial eye point and field of view;

means for generating successively warped images frames by warping a previously warped image frame with a different eye point and field of view until a predetermined distortion is reached between a most recently warped image frame and a second most recently warped image frame; and means for rendering a second image frame once the predetermined distortion has been reached.

* * * * *